United States Patent [19]
Ahlert et al.

[11] Patent Number: 6,031,191
[45] Date of Patent: Feb. 29, 2000

[54] SLIDING FRAME WITH A BREAK CONTACT ARRANGEMENT

[75] Inventors: Torsten Ahlert, Furstenwalde; Erhard Deylitz, Berlin, both of Germany

[73] Assignee: Siemens Aktiengesellschaft, Munich, Germany

[21] Appl. No.: 08/860,816

[22] PCT Filed: Jan. 9, 1996

[86] PCT No.: PCT/DE96/00061

§ 371 Date: Mar. 13, 1998

§ 102(e) Date: Mar. 13, 1998

[87] PCT Pub. No.: WO96/21960

PCT Pub. Date: Jul. 18, 1996

[30] Foreign Application Priority Data

Jan. 10, 1995 [DE] Germany .......................... 195 01 928

[51] Int. Cl.⁷ .............................. H01H 9/24; H02B 11/00
[52] U.S. Cl. ........................................ 200/50.21; 361/609
[58] Field of Search .............................. 200/50.21–50.27; 361/604–617

[56] References Cited

U.S. PATENT DOCUMENTS

| | | | |
|---|---|---|---|
| 4,183,073 | 1/1980 | Clausing | 200/50.22 |
| 4,443,676 | 4/1984 | Castonguay | 200/50.21 X |
| 4,447,682 | 5/1984 | Castonguay | 200/50.22 |
| 4,713,501 | 12/1987 | Herrmann | 200/50.22 |
| 4,773,870 | 9/1988 | Sinnig | 200/50.27 X |
| 5,343,355 | 8/1994 | Ishikawa | 361/617 |

FOREIGN PATENT DOCUMENTS

| | | |
|---|---|---|
| 0 577 111 | 1/1994 | European Pat. Off. . |
| 35 42 979 | 6/1987 | Germany . |
| 35 44 667 | 6/1987 | Germany . |

*Primary Examiner*—J. R. Scott
*Attorney, Agent, or Firm*—Kenyon & Kenyon

[57] ABSTRACT

A sliding frame for a movable power switch with a break contact arrangement is provided. The sliding frame includes protective plates mounted in front of the break contacts. To move the protective plates, there are rockers with pivoting arms together with control levers acted upon by the movable switch. The arrangement is shallow and the protective plates may be locked for incoming and outgoing connections.

10 Claims, 3 Drawing Sheets

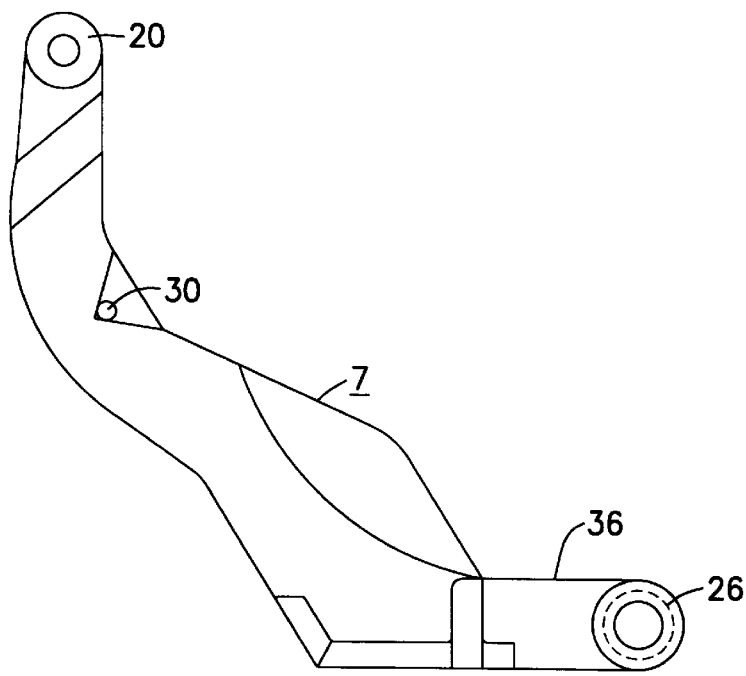
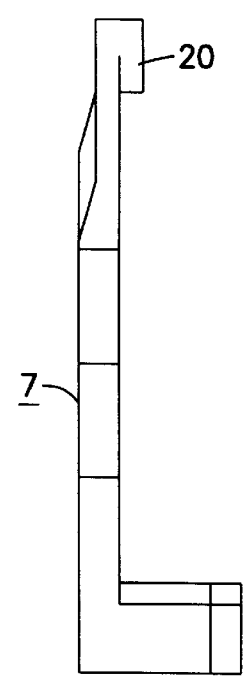
Fig. 2  Fig. 3
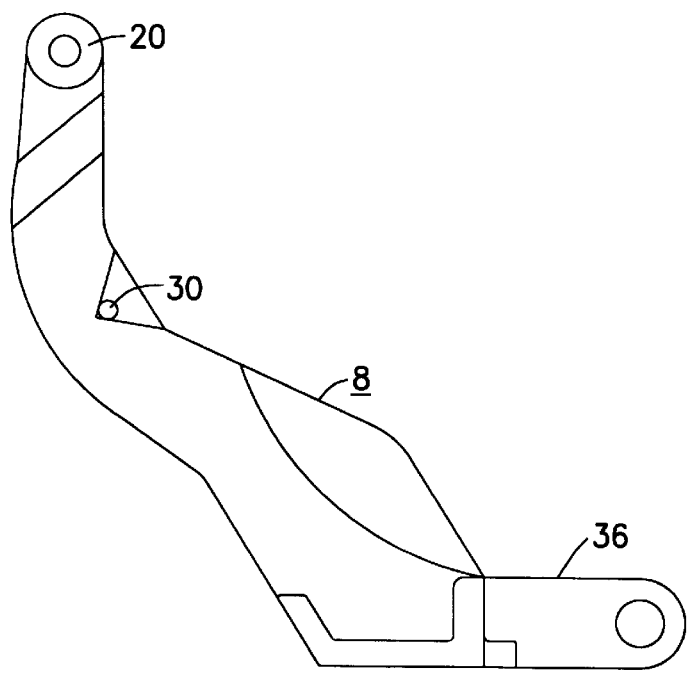
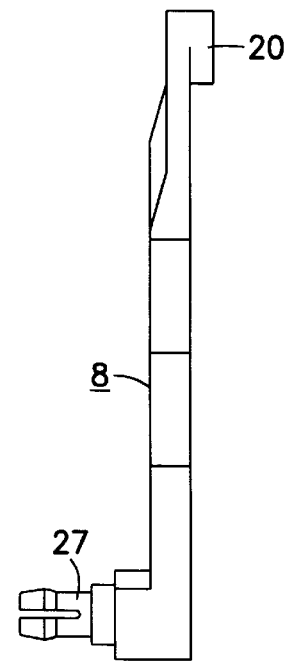
Fig. 4  Fig. 5

SLIDING FRAME WITH A BREAK CONTACT ARRANGEMENT

FIELD OF THE INVENTION

The present invention concerns a sliding frame for a movable power switch with a break contact arrangement and a protective device that can be actuated by a traveling motion of the power switch to prevent contact with voltage-conducting parts of the break contact arrangement, wherein the protective device has a lever arrangement to which the power switch is applied and a protective plate that can be moved by the lever arrangement.

BACKGROUND OF THE INVENTION

A sliding frame for a movable power switch is described in German Patent No. A 33 44 667 and European Patent A 0 577 111. Both of the known arrangements ensure that the protective plate is actuated during the relatively short stroke of the power switch and that the power switch can subsequently be brought into engagement with the break contact arrangement without further movement of the protective plate. In one of the known arrangements, this is achieved through lever arrangements, located on the side walls of the sliding frame, while in the other known arrangements, similarly operating lever components are attached to the rear wall of the sliding frame, where the break contact blocks working together with the power switch are located.

SUMMARY OF THE INVENTION

An object of the present invention is to provide a particularly compact design of the lever arrangement working with the protective plates. This is necessary because, in one of the known arrangements, the side walls of the sliding frame are used as carriers of actuating elements of the protective plates, while in the other known arrangement the side walls of the sliding frame are kept free of such elements, but the actuating elements have an inconveniently great depth.

According to the present invention, the object is achieved by the following features:

The lever arrangement comprises two articulatedly connected levers, one of which is configured as a rocker and has a rocker opening for engaging a guide pin of the other lever designed as a control lever to be acted upon by the power switch;

The rocker can be moved around a pivot mounted on the sliding frame and supports, on its end opposite the pivot, a pivoting arm for the protective plate;

The control lever is pre-stressed by a restoring spring against the rocker so that the guide pin of the control lever is next to the pivot of the rocker in its normal position and while the protective plate opens, and the control lever with its guide pin can be moved against the action of the restoring spring after the protective plate has been actuated, without further pivoting of the rocker.

The arrangement according to the present invention can be designed with a relatively shallow depth, since the control lever only needs to follow the straight-line motion of the power switch in part and can deflect along the link opening basically across the path of the power switch.

In medium-voltage switchgears with carriage or sliding frame power switches, arrangements are known (German Patent 35 42 979 A1) where a fixed-position connecting link is used as means for moving the power switch. A protective plate is actuated by a lever rod, which has a control lever mounted near the connecting link. This control lever is actuated through a crank pin of the drive of the carriage or sliding frame. Thus in this arrangement the protective plate is not directly driven by the motion of the power switch, as is the case with the aforementioned known arrangements, on which the present invention is based. Also the connecting link is not a part of the lever rod actuating the protective plate, but of the drive. Therefore, with a protective plate directly driven by a travel motion, there was no incentive to provide a control lever in conjunction with a connecting link designed so that the depth of the lever arrangement is considerably less despite the control lever being carried over the entire path of the power switch.

In particular with low-voltage power switches, it is desirable in view of the relatively short travel between the test position and the operating position that a shorter section of the travel segment be sufficient for actuating the protective plates. This can be enhanced by the fact that the aforementioned rocker opening is arranged in relation to the rocker pivot and the control lever so that in the normal position a force directed on the rocker pivot is exerted by the guide pin, while a force directed away from the pivot is exerted after the rocker is deflected.

Furthermore, the desired characteristics of the lever arrangement can be advantageously influenced by the fact that the rocker opening has two sections at an angle to one another, one of which, the section next to the pivot, is relatively short and has a direction that produces a force on the control lever guide pin away from the pivot when the rocker is actuated.

This results in a high transmission ratio between the control lever and the rocker in a first section of the motion. In a second section of the motion, the control lever slides in the rocker opening of the rocker that has already arrived at its end position.

The shallow depth of the lever arrangement provided for actuating the protective plate results in a well-defined relative motion between the pivoting arm of the rocker and the protective plate. Friction among the components working together can, however, be reduced by providing the pivoting arm of the rocker with an arc-shaped contour for low-friction engagement into a transport opening of the protective plate.

Theoretically, it is possible to actuate one protective plate, provided for all break contacts of a power switch, using an arrangement of one rocker and one control lever on both sides of the break contract. However, if separate protective plates are provided for the incoming and outgoing connections of a power switch, they can be advantageously actuated to move simultaneously in opposite directions, in a refinement of the present invention, by providing two rockers arranged as mirror images so that their pivots are located in close proximity and by providing two control levers, also as mirror images, whose ends opposite the guide pins are connected by a pivot pin, with the power switch acting upon both control levers through the pivot pin.

In order to provide safety against contact when a switchgear is operated, in a known arrangement the actuating mechanism of the protective plates is equipped with a locking device. It is desirable to lock the protective plates with a padlock at an accessible location. According to one embodiment of the present invention, this can also be achieved by providing each rocker with an extension arm, which in the normal position cross one another in the form of scissors, leaving a gap so that a lockable blocking lug can be introduced. Preferably this blocking lug can be installed on one of the withdrawable rails arranged on the sliding frame of the power switch. Since the rail extends to the front edge of the sliding frame, the padlock can be installed here.

The manufacturing cost of the above-described lever arrangement can be considerably reduced by making both rockers identical and mounting them one rotated 180° in relation to the other with the pivots being formed by pins extending on both sides of the rocker with corresponding half-shell-shaped support socket on the sliding frame. The assembly of the parts can be further facilitated by arranging the pins of each rocker on a lug designed as one piece with the rocker, but which can elastically deflect in relation to said rocker and by arranging the sliding frame in the support socket so that both pins are located on its opposite sides.

The gap formed through the use of two identical rockers one rotated 180° in relation to the other can be advantageously used for attaching springs. A helical draw spring pre-stressing the two control levers against one another can be used for this purpose as a restoring spring according to the present invention, and the rockers can be pre-stressed against one another in their normal position by an additional helical draw spring with the two draw springs arranged approximately in parallel. This arrangement operates so that basically only the spring tensioned between the control levers expands as the protective plates are actuated and the control levers subsequently continue to move.

BRIEF DESCRIPTION OF THE DRAWINGS

FIG. 2 shows a front view of a control lever according to the present invention.

FIG. 3 shows a side view of the control lever of FIG. 2.

FIG. 4 Shows a front view of another control lever according to the present invention.

FIG. 5 shows a side view of the control lever of FIG. 4.

DETAILED DESCRIPTION OF THE INVENTION

Figure 1:
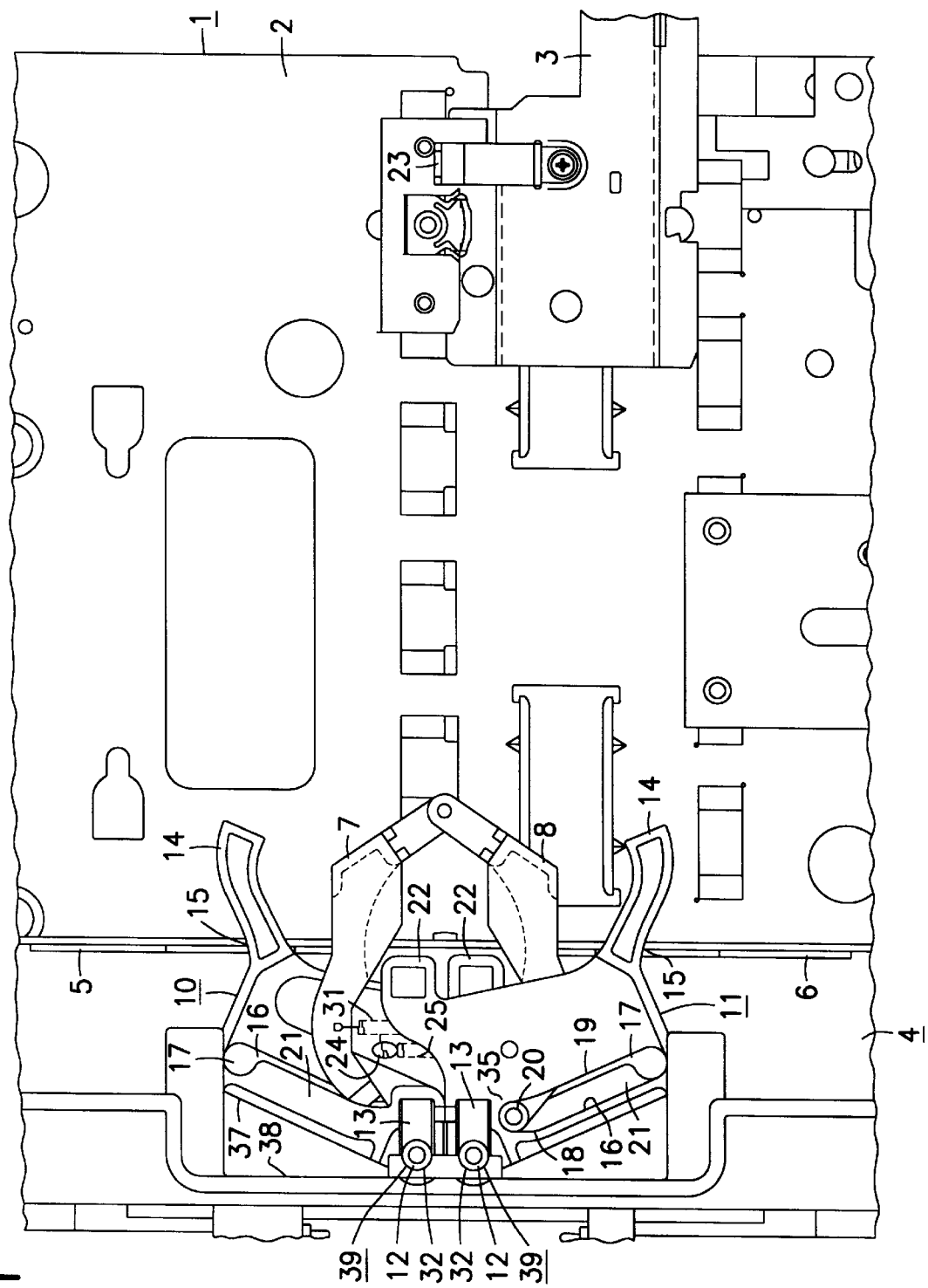
FIG. 1 shows a side view of a sliding frame according to the present invention with the side wall removed.

FIG. 1 shows a side view of a sliding frame 1 with the side wall removed so that there is an opening for the introduction of a low-voltage power switch (not illustrated) on the right side of FIG. 1. A withdrawable rail 3 is provided on the visible back side wall 2 for mounting a power switch that is not illustrated. On the left side of FIG. 1, a support 4 made of insulating material is shown, on which protective plates 5 and 6 are guided serving as the end of the break contact blocks not shown. Protective plates 5 and 6 can be actuated by control levers 7 and 8, as well as rockers 10 and 11.

Taking into consideration the width of sliding frame 1, two control lever arrangements 7, 8 and rockers 10, 11 are provided with the levers shown in FIG. 1 located below the sliding frame side wall removed in FIG. 1 and are identical in design to the levers located near side wall 2. Regarding the assembly of a power switch with a sliding frame and break contacts, reference is made to FIG. 1 of the aforementioned German Patent A 35 44 667.

Prior to describing in detail the joint operation of control levers 7, 8 and rockers 10, 11, let, us first explain the configuration of rockers 10 and 11, also with reference to FIG. 1. Rockers 10 and 11 may be identical and can be used in one position (FIG. 1 top) or in a position rotated 180° (FIG. 1 bottom). Rockers 10, 11, made, for example, of fiber-reinforced plastic, have a pivot pin 12, as part of a pivot 39, designed as one piece with the lever body as an elastically flexible lug 13. A pivoting arm 14 has an arc-shaped contour with variable width for engaging in a transport opening 15 of protective plate 5 or 6. Near pin 12 of rocker 10, 11, a rocker opening 16 ends; at one end of rocker opening 16 a contact opening 17 is provided for a guide pin 20 of one of control levers 7, 8 (FIGS. 2, 3; 4, 5). A wall piece 21 of rocker 10, 11 runs parallel to link opening 16 so that control lever 7, 8 is held engaged with rocker 10, 11 after its guide pin 20 is inserted in contact opening 17.

Link opening 16 of rockers 10, 11 has two sections 18, 19 at an angle to one another. Section 1E, is relatively short and is in contact with an end area 35, located near pin 12, of link opening 16. The longer section 19 extends to contact opening 17. The relative angular position of section 18 to section 19 is such that a force directed away from end area 35 is exerted on the guide pin when rockers 10 and 11 have come to their end position after being actuated.

Further features of rocker 10, 11 shown in FIG. 1 are extensions 22, which, in the normal position of rockers 10, 11 according to FIG. 1 are located next to and opposite each other so that a blocking lug 23 mounted on rail 3 can be introduced between the two extensions 22. If rail 3 is blocked, for example, by a padlock preventing it from moving, rockers 10 and 11 cannot pivot and thus protective plates 5 and 6 cannot be opened. Furthermore, rockers 10 and 11 are provided with a lug 24 to accommodate a helical draw spring. With such a draw spring 25 shown in FIG. 1, rockers 10 and 11 are tensioned against one another so that protective plates 5 and 6 assume their normal position closing the break contacts.

Control levers 7 and 8 are designed differently, as can be seen by comparing FIGS. 2 and 3, as well as 4 and 5. As the figures show, control lever 7 (FIGS. 2 and 3) has, at its end opposite to guide pin 20, an end bushing 26 provided to engage with a catch pin 27 at the corresponding end of control lever 8 (FIGS. 4 and 5). If catch pin 27 and end bushing 26 are brought into engagement as shown in FIG. 1, these parts form a link, which protrudes into the sliding frame 1 and through which the power switch to be placed in the sliding frame 1 can be acted upon when it is moved in the direction of the operating position through an appropriate driving device. An additional helical spring tensioning control lever 7 and control lever 8 against one another is mounted in openings 30 of control lever 7 and control-lever 8. Such a helical spring 31 is shown, for example, in FIG. 1. It can be seen that helical spring 31 is approximately parallel to helical spring 25 in the gap between rockers 10 and 11.

Figure 6:
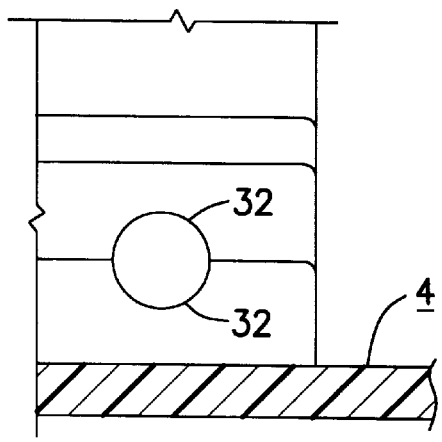
FIG. 6 shows a detailed view of a portion of a lever arrangement for a rocker according to the present invention.
Figure 7:
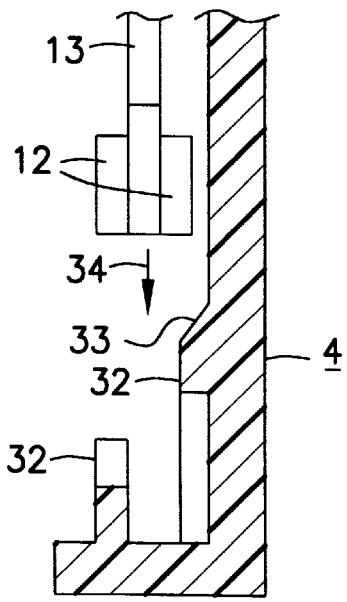
FIG. 7 shows a detailed view of a lever arrangement for a rocker according to the present invention.
Figure 8:
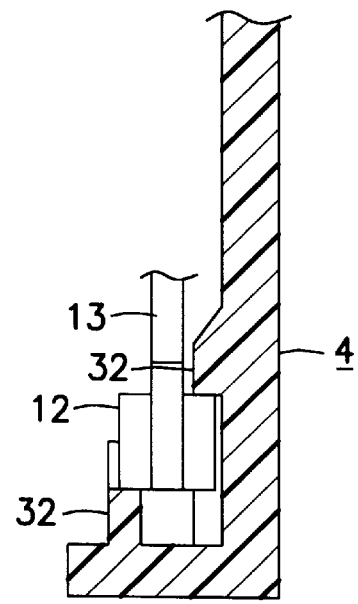
FIG. 8 shows the lever arrangement for a rocker of FIG. 7 in a second position.

To accommodate rockers 10 and 11, support 4 is provided with half-shell-shaped support sockets 32 for pins 12, which are also part of pivot 39. As can be seen in more detail in FIGS. 6, 7, and 8, showing support 4 in the area of the pivot of pivot 39 of a rocker 10 or 11, the half-shell-shaped support sockets 32 of this one pivot 39 are arranged at a distance approximately corresponding to the thickness of lug 13. The two support sockets are at 180° in relation to one another. Furthermore, an oblique surface 33 is provided in such an arrangement that lug 13 is deflected in the direction of arrow 34, shown in FIG. 7, across the direction of arrow 34 when the respective rocker is installed. This causes the rocker to be installed on support 4 as a snap-on assembly. When assembled, as shown in FIG. 8, the left support socket 32 encloses left pin 12 from above, while the right support socket 32 encloses right pin 12 from above. Control levers 7 and 8 are brought to rest, with their guide pins 20, on an end area 35 of link opening 17, located near pin 12, by helical draw spring 31 (FIG. 1). This causes rockers 10, 11 to be subject to a high transmission ratio when the link of control levers 7 and 8 formed by end bushing 26 and catch pin 27 are acted upon by a power switch in the aforementioned manner. Accordingly, pivoting arms 14 of rockers 10, 11 are quickly moved, moving protective plates 5 and 6. Although these protective plates can be made of a thin plate-shaped material in the well-known manner, movement takes place with relatively little friction, since the contour of pivoting arm 14 is shaped to match the pivoting angle. Toward the end of the pivoting movement of rockers 10 and 11, pivoting arms 14 are only slightly above protective plates 5 and 6, so that they do not protrude into the space provided for the power switch. Guide pins 20 of control levers 7 and 8 remain in the aforementioned end area 35 of link openings 16 during the above-described cycle. However, when rockers 10 and 11 come to their end position, where bottom 37 of rockers 10, 11 is in contact with a mating surface 38 on support 4, the force exerted by guide pin 20 is no longer directed toward the respective end zone 35 next to pivot 39, but away from it in the direction of insertion opening 17 at the opposite end of link opening 16. This is aided by the aforementioned small angle between sections 18 and 19 of link opening 16 next to pin 12. When control levers 7 and 8 continue to be acted upon, guide pins 20 are disengaged from end area 35 and move into section 19 of link opening 16 until they reach its opposite end. The distance between the link formed by end bushing 26 and catch pin 27 and support 4 is thus reduced according to the path of the aforementioned power switch.

Although in the above-described embodiment rockers and control levers arranged pairwise are provided, it would also be possible to provide a common protective plate for the incoming and outgoing connections of a power switch and to actuate it with only one rocker and one control lever at either side. In this case, only appropriate guidance of the control lever at its end facing the power switch would have to be ensured. The arrangement described has, however, the advantage that separate protective plates are available for incoming and outgoing connections and these can also be locked separately. For example, the bottom protective plate 6 (FIG. 1) can be opened by actuating rocker 11 and secured with blocking lug 23. The width of extension 22 of rockers 10 and 11 should be such that they can be secured by locking lug 23 only in the position illustrated of the parts or in the above-described actuating position. Top protective plate 5 can also be secured in its open position.

We claim:

1. A sliding frame for a movable power switch, the movable power switching including a break contact arrangement, the sliding frame comprising:

a pivot;

an insulating protective plate;

a rocker pivotable about the pivot, the rocker having a link opening at a first end and a pivoting arm, for engaging the protective plate, at a second end, the second end being opposite to the first end;

a restoring spring; and a control lever to be acted upon by a travel movement of the movable power switch, the control lever being articulately connected to the rocker, the rocker and the control lever together forming a lever arrangement for moving the protective plate, the control lever including a guide pin engaging with the link opening of the rocker, the control lever being pre-tensioned in relation to the rocker by the restoring spring so that the guide pin of the control lever is near the pivot in a non-actuated position and while the protective plate opens, the control lever and the guide pin moving against the action of the restoring spring along the link opening after the protective plate has been actuated without pivoting of the rocker;

wherein the lever arrangement and the protective plate form a protective device which is actuated through the travel motion of the power switch, the protective device preventing contact with energized parts of the break contact arrangement.

2. The sliding frame according to claim 1, wherein the link opening is arranged in relation to the pivot and the control lever so that the guide pin exerts a force on the pivot in the non-actuated position and a force directed away from the pivot is exerted when the rocker is actuated.

3. The sliding frame according to claim 2 wherein the link opening has a first section and a second section disposed at an angle to one another, the first section being short relative to the second section and is disposed proximate to the pivot and wherein when the rocker is actuated, the first section applies the force to the guide pin directed away from the pivot.

4. The sliding frame according to claim 1, wherein the protective plate has a transport opening, and wherein the pivoting arm has an arc-shaped contour for low-friction engagement in the transport opening of the protective plate.

5. A sliding frame for a movable power switch, the movable power switching including a break contact arrangement, the sliding frame comprising:

two pivots;

two insulating protective plates;

two rocker pivotable about respective ones of the two pivots and being arranged as mirror images, each of the two rockers having a link opening at a first end and a pivoting arm for engaging a respective one of the protective plates at a second end, the second end being opposite to the first end;

a restoring spring; and two control levers to be acted upon by a travel movement of the movable power switch, each of the two control levers being articulately connected to a corresponding one of the two rockers, each of the two control levers and the corresponding one of the two rockers together forming a respective lever arrangement for simultaneously moving the respective one of the protective plates in an opposite direction from another of the protective plates, each of the two control levers including a respective guide pin engaging with the link opening of the corresponding one of the two rockers, the two control levers being connected to one another via a link pin at an end opposite the respective guide pin, the power switch acting on both of the two control levers through the link pin, the two control levers being pre-tensioned in relation to the two rockers by the restoring spring so that the guide pin of the one of the two control levers is near the respective one of the two pivots in a non-actuated position and while the respective one of the two protective plates opens, the one of the control levers and the guide pin moving against the action of the respective one of the restoring springs along the link opening after the respective one of the two protective plates has been actuated without pivoting of the corresponding one of the rockers;

wherein the lever arrangements and the two protective plates form a protective device which is actuated through the travel motion of the power switch, the protective device preventing contact with energized parts of the break contact arrangement.

6. The sliding frame according to claim 5, wherein each of the two rockers includes a respective extension, and wherein the extensions cross one another in a form of scissors, providing a gap so that a lockable blocking lug may be inserted in the gap.

7. The sliding frame according to claim 6, further comprising:

a withdrawable rail, the lockable blocking lug being mounted on the withdrawable rail.

8. The sliding frame according to claim 5, wherein the two rockers are identical to each other and are arranged 180° in relation to one another, and wherein the two pivots include pins extending through the rockers and supported by half-shell-shaped support sockets.

9. The sliding frame according to claim 8, wherein each one of the two rockers includes a respective lug integral therewith and elastically deflectable with respect to the one of the two rockers wherein the support sockets are arranged so that the pins are enclosed on opposite sides.

10. The sliding frame according to claim 5, wherein the restoring spring is a first helical draw spring pre-tensioning the two control levers against one another, the sliding frame further comprising a second helical draw spring pre-tensioning the two rockers against one another in the non-actuated position, the first helical draw spring and the second helical draw spring arranged approximately parallel to one another.

* * * * *